(12) United States Patent
Wang et al.

(10) Patent No.: US 9,398,588 B2
(45) Date of Patent: Jul. 19, 2016

(54) ENHANCED LIGHTING NETWORK TO SERVE MOBILE CELLULAR USERS AND METHOD OF OPERATION THEREOF

(71) Applicant: KONINKLIJKE PHILIPS N.V., Eindhoven (NL)

(72) Inventors: Jianfeng Wang, Ossining, NY (US); Dave Alberto Tavares Cavalcanti, Mahopac, NY (US); Hongqiang Zhai, Jersey City, NJ (US); Kiran Srinivas Challapali, New City, NY (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/354,386

(22) PCT Filed: Oct. 30, 2012

(86) PCT No.: PCT/IB2012/056022
§ 371 (c)(1),
(2) Date: Apr. 25, 2014

(87) PCT Pub. No.: WO2013/064979
PCT Pub. Date: May 10, 2013

(65) Prior Publication Data
US 2015/0126200 A1  May 7, 2015

Related U.S. Application Data

(60) Provisional application No. 61/553,436, filed on Oct. 31, 2011.

(51) Int. Cl.
| H04W 72/04 | (2009.01) |
| H05B 37/02 | (2006.01) |
| H04W 36/00 | (2009.01) |

(52) U.S. Cl.
CPC ...... *H04W 72/0446* (2013.01); *H04W 36/0072* (2013.01); *H04W 72/0493* (2013.01); *H05B 37/0272* (2013.01); *Y02B 20/72* (2013.01)

(58) Field of Classification Search
CPC ............ H04W 72/0446; H04W 36/0072; H04W 72/0493
See application file for complete search history.

(56) References Cited

U.S. PATENT DOCUMENTS

| 6,912,408 | B1 * | 6/2005 | O'Neill et al. ............... 455/561 |
| 2003/0190032 | A1 * | 10/2003 | Ravishankar ............... 379/229 |
| 2003/0222587 | A1 | 12/2003 | Dowling |
| 2006/0133318 | A1 * | 6/2006 | Jung et al. ............... 370/331 |
| 2006/0253885 | A1 | 11/2006 | Murphy |

(Continued)

FOREIGN PATENT DOCUMENTS

| CN | 201967184 U | 9/2011 |
| DE | 10351431 A1 | 6/2005 |

OTHER PUBLICATIONS

"Lumen IQ" Streetlight Intelligence, 2011.

*Primary Examiner* — Kashif Siddiqui
*Assistant Examiner* — Minjung Kim

(57) ABSTRACT

A method to control a lighting network having a plurality of light units, the method may be controlled by a lighting operator which may obtain information related to service availability for each of the light units; map the information related to service availability for each of the light units to form a service availability information map comprising attribute information of each of the light units; determine one or more of service policies, service schedules, and operational parameters for each of the plurality of light units for a service time period; and/or provide cellular communication service to one or more cellular stations in a service area of the light units in accordance with one or more of the determined service policies, service schedules, and operational parameters for the service time period.

15 Claims, 6 Drawing Sheets

(56) References Cited

U.S. PATENT DOCUMENTS

| | | |
|---|---|---|
| 2007/0222581 A1 | 9/2007 | Hawkins |
| 2008/0085707 A1* | 4/2008 | Fadell ........................ 455/435.3 |
| 2009/0066258 A1* | 3/2009 | Cleland et al. ................ 315/158 |
| 2010/0029268 A1 | 2/2010 | Myer |

* cited by examiner

ENHANCED LIGHTING NETWORK TO SERVE MOBILE CELLULAR USERS AND METHOD OF OPERATION THEREOF

CROSS-REFERENCE TO PRIOR APPLICATIONS

This application is the U.S. National Phase application under 35 U.S.C. §371 of International Application No. PCT/IB2012/056022, filed on Oct. 30, 2012, which claims the benefit of U.S. Provisional Patent Application No. 61/553,436, filed on Oct. 31, 2011. These applications are hereby incorporated by reference herein.

The present system relates to lighting networks and, more particularly, to enhanced lighting networks which may dynamically allocate cellular communication services to cellular users such as cellular stations (CSs) and/or cellular applications and a method of operation thereof.

Typically, lighting systems comprise a plurality light units (LUs) which are fixedly mounted to structures such as poles, walls, ceilings, beams, cables, etc., in indoor or outdoor environments to provide illumination. The LUs comprise one or more luminaires and a control portion to control operation of the luminaires. As communication technologies have advanced, lighting systems have begun to incorporate wired or wireless communication features through a backhaul infrastructure to enable communication with networks for lighting management. The backhaul infrastructure of the lighting system includes links between a main communication network such as the Internet, to local lighting systems typically through a gateway. These links may be between lighting unit(s) and the gateway itself and/or may be between light units, such as for relayed communications to the gateway and for enabling local control. Accordingly, these lighting systems may access networks through the backhaul infrastructure using couplings such as the Internet via wired or wireless communication methods such as fiber, powerline, Ethernet, WiFi, cable, very high-speed DSL (VDSL), RF mesh, cellular, visible light communication (VLC), etc., for lighting management purposes to control luminaires (e.g., turn on/off, dim, etc.) throughout the lighting system.

Although these lighting systems may communicate through the backhaul infrastructure with a network, they are considered users of these networks as opposed to providers of network communications. For example, some outdoor lighting systems form outdoor lighting networks (OLNs) which may connect to a cellular network via a gateway such as a segment controller (e.g., a single connection) to communicate with a remote lighting management system which controls only lamp operations (e.g., on/off operation) of the LUs of the OLNs. Thus, these OLNs are users of the communications network as opposed to providers of a cellular network and/or providers of cellular services.

Further, with regard to conventional base stations (BSs) which provide cellular communication services to CSs, these base stations are usually located in fixed locations such as on rooftops, towers, or other types of structures. The base stations provide cellular communication services with a desired quality of service (QoS) to only a limited number of CSs within a service area (SA) of the corresponding base station which is usually fixed in accordance with the location. The SA of the base stations is typically calculated based upon a number of expected users (e.g., CSs) at a certain time who are expected to be in a geographic area which corresponds with the SA. Unfortunately, when the number of CSs in an SA of the base station exceeds capacity of the base station, such as may occur during social gatherings such as sporting events, concerts, indoor or outdoor events, and the like, the base stations may not be able to provide cellular communication services to the CSs or may provide cellular communication services with a reduced QoS, each of which may inconvenience users of the CSs.

Fortunately, whether located in indoor or outdoor settings, LUs are typically located in closer proximity to CSs than are base stations. There is a desirability to reduce the distances between CSs and the base stations that service them because as the distances are reduced, the power required for communication between them may also be reduced.

Accordingly, there is a need for a cellular based communication system which may dynamically allocate base stations based upon communication needs in a geographic area.

In accordance with an aspect of the present system, there is disclosed a method to control a lighting network (LN) having a plurality of light units (LUs), the method may be controlled by a lighting operator which may obtain information related to service availability for each of the LUs; map the information related to service availability for each of the LUs to form a service availability information map (SAM) including attribute information of each of the LUs; determine one or more of service policies, service schedules, and operational parameters for each of the plurality of LUs for a service time period (Ts); and/or provide cellular communication service to one or more cellular stations (CSs) in a service area of the LUs in accordance with one or more of the determined service policies, service schedules, and operational parameters for the Ts.

The method may further include an act of selecting a serving cellular operator (SCO) for the service time period (Ts) from a plurality of cellular operators, wherein each cellular operator corresponds with a different cellular service provider. Moreover, it is envisioned that the method may include an act of providing one or more of environmental and surveillance information in accordance with one or more of the determined service policies, service schedules, and operational parameters. It is also envisioned that the method may include an act of controlling luminaires of the plurality of LUs to provide illumination in accordance with one or more of the service policies, service schedules, and operational parameters for the service time period (Ts). Moreover, the SCO may be selected in accordance with bid information received from one or more of the plurality of cellular operators. The method may further include an act of providing the SAM to the plurality of cellular operators. The method may further include an act of activating cellular service of the CSs which are subscribers of the SCO only during the service time period (Ts). Further, the method may include acts of: determining whether the service time period (Ts) has elapsed; and performing handoffs of the CSs from corresponding base stations (BSs) of the lighting network to base stations of a cellular network controlled by the SCO when it is determined that the service time period (Ts) has elapsed.

In accordance with embodiments of the present system, there is disclosed a lighting system to provide mobile communication services, the lighting system may include: a plurality of light units (LUs) each having a wireless communication portion and a luminaire including at least one light source to provide illumination, the wireless communication portion including a base station to provide cellular communication service to one or more cellular stations (CSs); and a lighting operator which: may obtain information related to service availability for each of the LUs, map the information related to service availability for each of the LUs to form a service availability information map (SAM) including attribute information of each of the LUs, determine one or more of service policies, service schedules, and operational parameters for each of the plurality of LUs for a service time period (Ts), and/or provide cellular communication service to one or more cellular stations (CSs) in a service area of the LUs in accordance with one or more of the determined service policies, service schedules, and operational parameters for the service time period (Ts).

Further, it is envisioned that the lighting operator may select a serving cellular operator (SCO) for the service time period (Ts) from a plurality of cellular operators, wherein each cellular operator corresponds with a different cellular service provider which controls a corresponding cellular network. Further, the lighting operator may further provide one or more of environmental and surveillance information in accordance with one or more of the determined service policies, service schedules, and operational parameters. It is also envisioned that the lighting operator may further control luminaires of the plurality of LUs to provide illumination in accordance with one or more of the service policies, service schedules, and operational parameters for the service time period (Ts). Moreover, the lighting operator may select the SCO in accordance with bid information received from one or more of the plurality of cellular operators. Further, lighting operator may provide the SAM to the plurality of cellular operators. It is also envisioned that the lighting operator may further activate cellular service of the CSs which are subscribers of the SCO only during the service time period (Ts). The lighting operator may also determine whether the service time period (Ts) has elapsed; and/or handoff one or more of the CSs from corresponding base stations (BSs) of the lighting network to base stations of a cellular network controlled by the SCO when it is determined that a current service time period (Ts) has elapsed.

In accordance with embodiments of the present system, there is disclosed a computer program stored on a computer readable memory medium, the computer program configured to provide mobile communication services, the computer program may include: a program portion configured to: obtain information related to service availability for each of the LUs; map the information related to service availability for each of the LUs to form a service availability information map (SAM) including attribute information of each of the LUs; determine one or more of service policies, service schedules, and operational parameters for each of the plurality of LUs for a service time period (Ts); and/or provide cellular communication service to one or more cellular stations (CSs) in a service area of the LUs in accordance with one or more of the determined service policies, service schedules, and operational parameters for the service time period (Ts).

It is also envisioned that the program portion may be further configured to select a serving cellular operator (SCO) for the service time period (Ts) from a plurality of cellular operators, wherein each cellular operator corresponds with a different cellular service provider. Further, the program portion may be further configured to provide one or more of environmental and surveillance information in accordance with one or more of the determined service policies, service schedules, and operational parameters. Moreover, the program portion may also be further configured to control luminaires of the plurality of LUs to provide illumination in accordance with one or more of the service policies, service schedules, and operational parameters for the service time period (Ts).

The invention is explained in further detail, and by way of example, with reference to the accompanying drawings wherein.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system.

Figure 1:
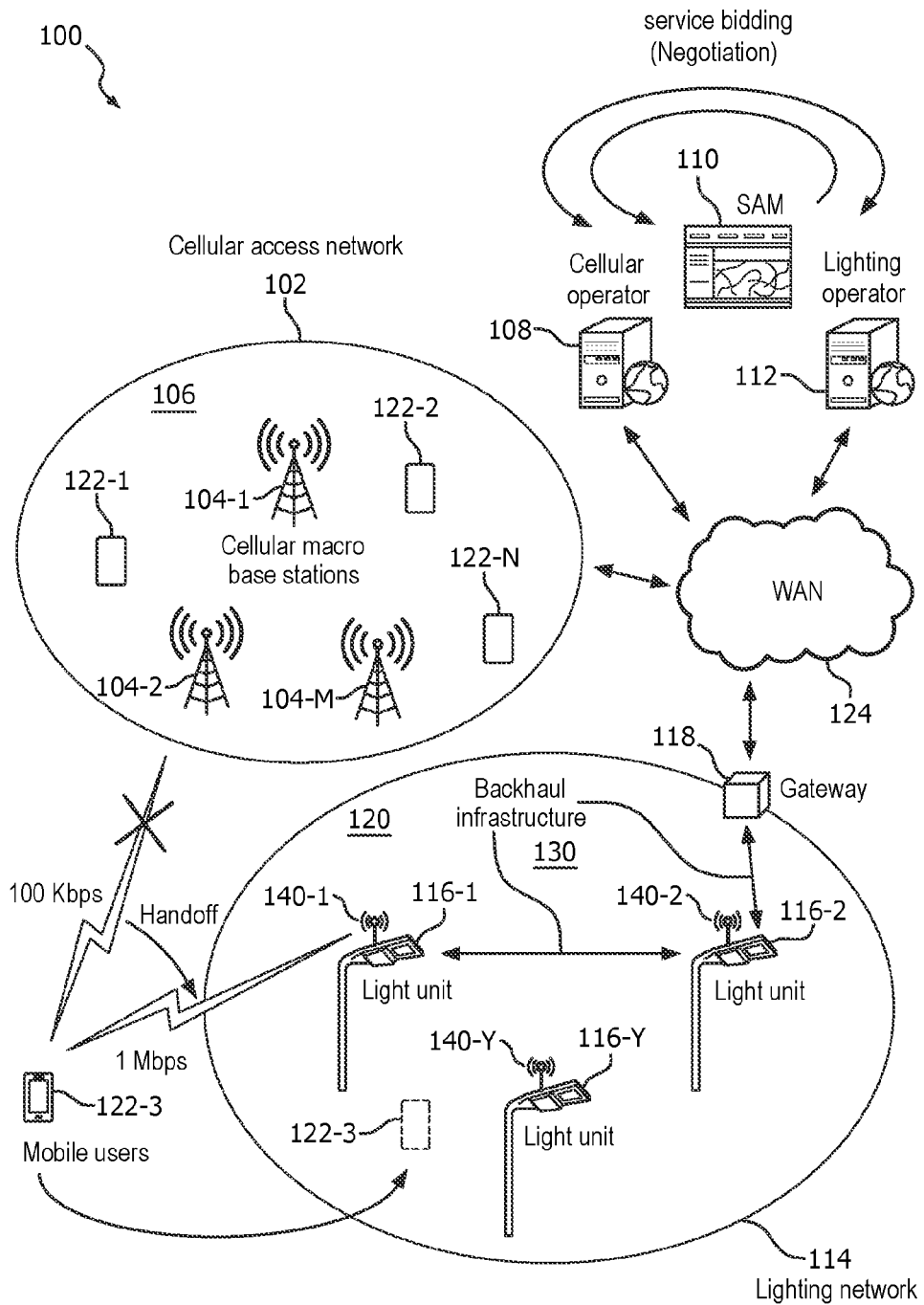
FIG. 1 shows a lighting system in accordance with embodiments of the present system.

FIG. 1 shows a lighting system 100 in accordance with embodiments of the present system illustratively shown during a handoff operation. The lighting system 100 includes a cellular access network 102, a lighting network 114 and a plurality of cellular stations 122-1 through 122-N (generally 122-x). The cellular access network 102 includes a plurality of base stations 104-1 through 104-M. The lighting network 114 includes a plurality of light units 116-1 through 1116-Y (generally 116-x) that provide an illumination operation (e.g., provide lighting for an area, provide information such as in a form of a sign, etc.). The light units 116-x may communicate with each other and/or with a communication network 124 using a backhaul infrastructure 130 which includes a service gateway 118 and a light unit communication module (e.g., a transmitter and/or receiver device for the light unit) generally shown as communication modules 140-1, 140-2, ..., 140-Y. Generally, the communication module may be made up of hardware device portions which may include and/or may be controlled by software (program) portions. The backhaul infrastructure may include wireless and/or wired communications between one or more portions (e.g., between light units and/or between one or more light units and the service gateway). Each of the base stations of a corresponding light unit 116-x may include the communication modules. In accordance with embodiments of the present system, the communication modules may each include a first communication portion to communicate with backhaul infrastructure and a second communication portion to communicate with mobile/cellular users. As may be readily appreciated, it also envisioned that the communication modules may be integrated with each other if desired.

In accordance with embodiments of the present system, the first communication module may be configured to communicate with the backhaul infrastructure 130 for example using an Internet Protocol (IP), asynchronous transfer mode (ATM) protocol based communication, etc. over a communication medium such as over fiber, cable, broadband, radio frequency (RF), etc. Further, the second communication module may be configured to wirelessly communicate with the CSs 122-$x$ so as to enable providing cellular service to the corresponding CSs in accordance with, for example, negotiated service policies (e.g., quality of service (QoS)), service schedules, and/or operational parameters for a corresponding service time period (Ts). As shown, the backhaul infrastructure may include relay communications for a light unit that does not have a direct coupling between the light unit and the gateway 118. Such an illustrative relay coupling is shown between light unit 116-1 and light unit 116-2. In accordance with embodiments of the present system, the communication network 124 is shown coupled to a cellular operator 108 and a lighting operator 112 as discussed further herein.

In accordance with embodiments of the present system, a cellular station (CS) 122-3 is shown during a handoff operation (e.g., switching from one access point to another). In the illustrative showing, the CS 122-3 is switching from a base station (BS) 104-2 of the cellular access network 102 to a communication module 140-1 of a light unit (LU) 116-1. As shown, the communication module 140-1 is one of a plurality of communication modules (generally 140-Y) of corresponding LUs 116-1 through 116-Y of a lighting network 114. In accordance with embodiments of the present system, one or more of the plurality of communication modules 140-Y while utilized for lighting operation through the backhaul infrastructure 130 may also be utilized to provide wireless cellular communication service, and/or other application(s) (hereinafter one or more of which will be collectively referred to as cellular service unless the context indicates otherwise) to users such as the CS 122-3 in accordance with negotiated service policies, service schedules, and/or operational parameters (e.g., parameters related to connectivity). In accordance with embodiments of the present system, operational parameters may include frequency bands, MIMO/Multiple (multiple-input and multiple-output) antenna modes, duplexing scheme (e.g., Time Division Duplex (TDD) vs. Frequency Division Duplex (FDD)), transmission power, etc. for a corresponding service time period (Ts). Similarly, other CSs 122-$x$ may handoff between one or more base stations 104-$x$ of the cellular access network 102 and one or more communications modules 140-Y of the lighting network 114 when necessary and/or otherwise desirable. The handoff of the CS may be controlled by handoff procedures including underlying communication protocols as well service contracts including QoS agreements between providers of the cellular access network 102 and providers of the lighting network 114. The base stations 104-$x$ of the cellular access network 102 may define a service area 106 of the cellular access network 102 in which the CSs 122-$x$ may receive wireless cellular service. Similarly, the communications modules 140-Y of the LUs 116-$x$ may define a service area 120 of the lighting network 114 in which the CSs 122-$x$ may receive cellular service in accordance with embodiments of the present system.

A lighting operator 112 may manage the overall operation of the plurality of light units 116-$x$ and may communicate with the LUs 116-1 units directly or via a network 124 such as a wide area network (WAN), etc. However, it is envisioned that the network 124 may include other networks such as a local area network (LAN), and/or other communication methods such as fiber, powerline, Ethernet, WiFi, cable, very high-speed DSL (VDSL), RF mesh, cellular, visible light communication (VLC), etc. The lighting operator 112 may include one more processors which may be configured to perform one or more processes of the present system and may, for example, track and/or control resources of the lighting network 114 and may determine a load on the lighting network 114. Accordingly, the lighting operator 112 may track location, capabilities, available time, available bandwidth resources, load, etc., of each light unit 116-$x$ and may form or update corresponding service availability information (SAI) and thereafter map this information to form and/or update a service availability map (SAM) in accordance with, for example, the SAI. For example, the lighting operation 112 may estimate current and/or future bandwidth requirements for lighting operations and determine what excess bandwidth is available for servicing CSs. The lighting operator 112 may then provide the SAI and/or SAM to the cellular operator 108 which may control the cellular access network 102 and/or may otherwise desire to provide service to one or more CSs. In providing service to the one or more CSs, the lighting operator 112 may perform a service bidding process to select one or more cellular operators 108 as a serving cellular operator (SCO) and/or to determine (e.g., via a negotiation method) service schedules, service policies, and/or operational parameters for a corresponding service time period (Ts). The serving cellular operator may be selected from one or more of the cellular operators 108 as will be discussed below with reference to FIG. 3 and/or may be predetermined (e.g., in accordance with system settings).

Each of these one or more cellular operators 108 may control a corresponding one or more base stations 104-$x$ of the cellular access network 102 and/or may otherwise provide cellular communication services. In accordance with embodiments of the present system, the cellular access network 102 may include a plurality of subgroups of base stations 104-$x$ wherein each group may be controlled by a corresponding cellular operator 108.

Referring back to the lighting operator 112, after determining the service policies service schedules, and/or service parameters for a corresponding service time period (Ts), the lighting operator 112 may upload and/or otherwise provide a mobile service schedule to each light unit 116-$x$ that it manages and may configure service policies and/or operational parameters of each of the light units 116-$x$. In accordance with embodiments of the present system, the service parameters may include the number of mobile users supported, data rate, packet loss rate, delay, jitter, and other QoS related parameters. In this way, the lighting operator 112 may provide (e.g., by activation, etc.) and/or otherwise manage the LUs 116-$x$ to provide cellular service during corresponding service time period(s) (Ts(s)) in accordance with corresponding service policies, service schedules, and/or service parameters. However, it is also envisioned that the lighting operator 112 may enable the one or more selected cellular operator(s) to activate mobile service and manage the LUs 116-$x$ (or selected LUs 116-$x$) to provide cellular service during agreed service periods.

With regard to the LUs 116-$x$, they may determine (e.g., using one or more sensors) service requirements (e.g., based on local lighting conditions) and report service availability to the lighting operator 112. The service availability may include information related to the available time and/or capacity For example, in accordance with embodiments of the present system, the service may be able to serve 10 CSs from 9-10 AM and 20 CSs from 10-11 AM. As may be readily appreciated, in this way based on service requirements at any given time, the present system may service a given number of CSs. Generally, the service capacity may represent a maximum number of CSs 122-x served by the base stations 116-x, applications (e.g., surveillance applications, environmental applications, etc.) supported by the light units 116-x, access capacity (or relay capacity, and/or backhaul capacity. The light units 116-1 may activate and/or provide cellular service to users such as the CSs 122-x and applications (e.g., are subscribers of the serving cellular operator(s) in accordance with service schedules, service policies and/or operational parameters for a corresponding service time period (Ts). Conversely, these light units 116-x may deactivate service for users (e.g., CSs 122-x and/or applications) when the service time (Ts) is determined to have lapsed.

Accordingly, the present system may manage access and assist handoff of CSs 122-x according to handoff rules and in accordance with the service schedules and/or service policies determined by the lighting operator 112 and/or the SCO. Further, the present system may manage mobile traffic and handle priority among various users such as mobile users (e.g., the CSs 122-x), application users, lighting users, and/or emergency users.

Figure 2:
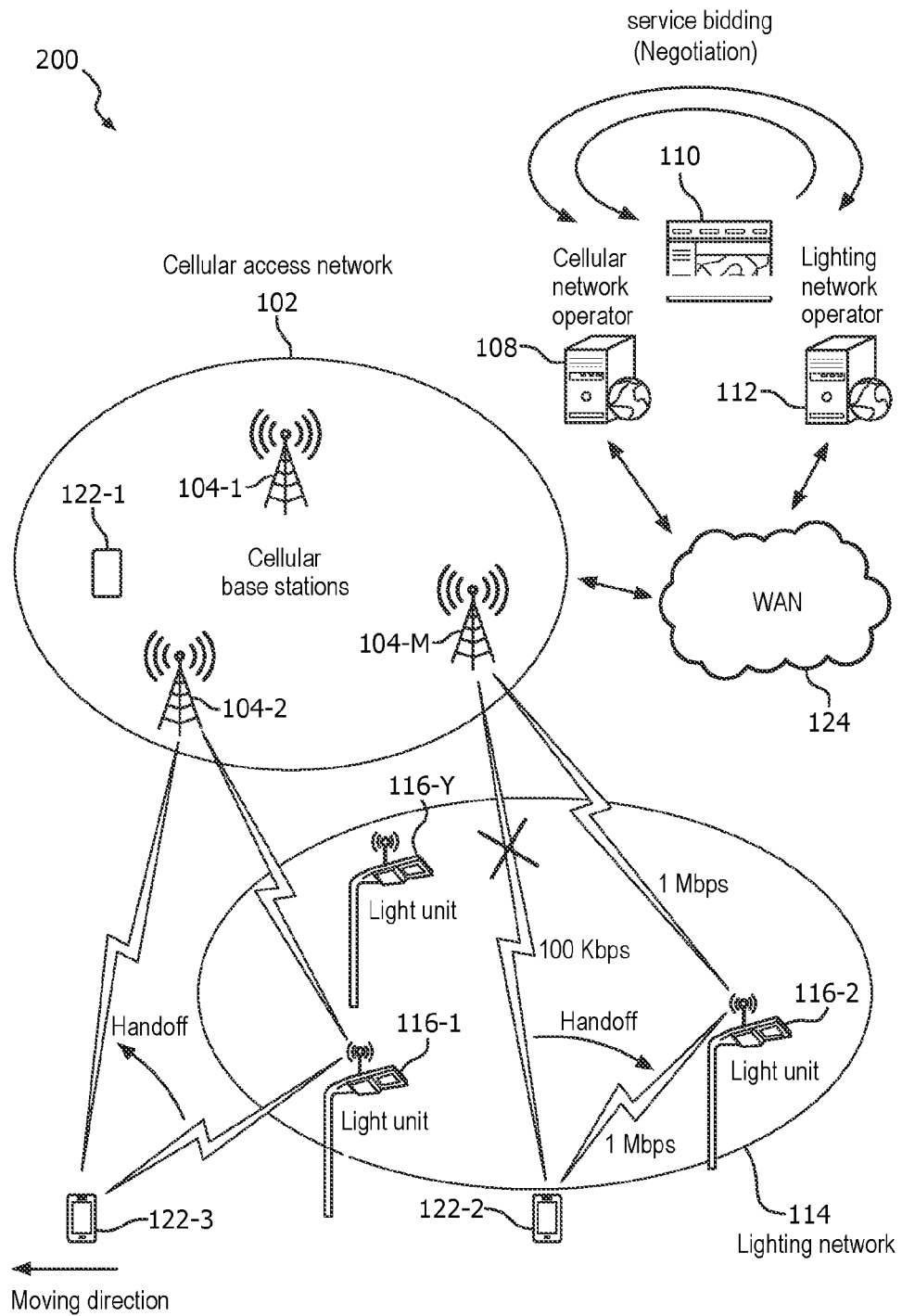
FIG. 2 shows a lighting system in accordance with embodiments of the present system.

FIG. 2 is a schematic diagram of a lighting system 200 in accordance with embodiments of the present system. The lighting system 200 may support handoff of a CS such as a CS 122-2 from a base station 104-x such as a base station 104-M of the cellular access network 102 to a light unit 116-x such as a light unit 116-2 during a service time period (Ts) in which the CS 122-2 is authorized. Similarly, the lighting system 200 may support handoff of a CS such as the CS 122-3 from a light unit 116-x such as a light unit 116-1 of the lighting network 114 to a base station 104-x such as a base station 104-2 when necessary such as when the CS 122-3 enters a service area of the base station 104-2 or when it is detected that the CS 122-3 is not an authorized for accessing the light unit 116-1 or the lighting network 114 generally. A CS may not be authorized for example when a current service time period (Ts) in which the CS 122-3 was authorized to receive service has lapsed, etc. Note, in the lighting system 200 backhaul operations are assumed to be supported by the cellular operator 108 as opposed to the lighting operator 112 as in FIG. 1. In the illustrative embodiment shown, the lighting network itself relies on the cellular network for backhauling. However, in the illustrative embodiment the lighting network can still boost cellular service capacity and improve throughput of mobile users by providing the CSs access to the cellular access network 102 through the lighting network 114 which for example in the case of the CS 122-2, is more proximate to the CS 122-2 than the cellular access network 102.

Figure 3:
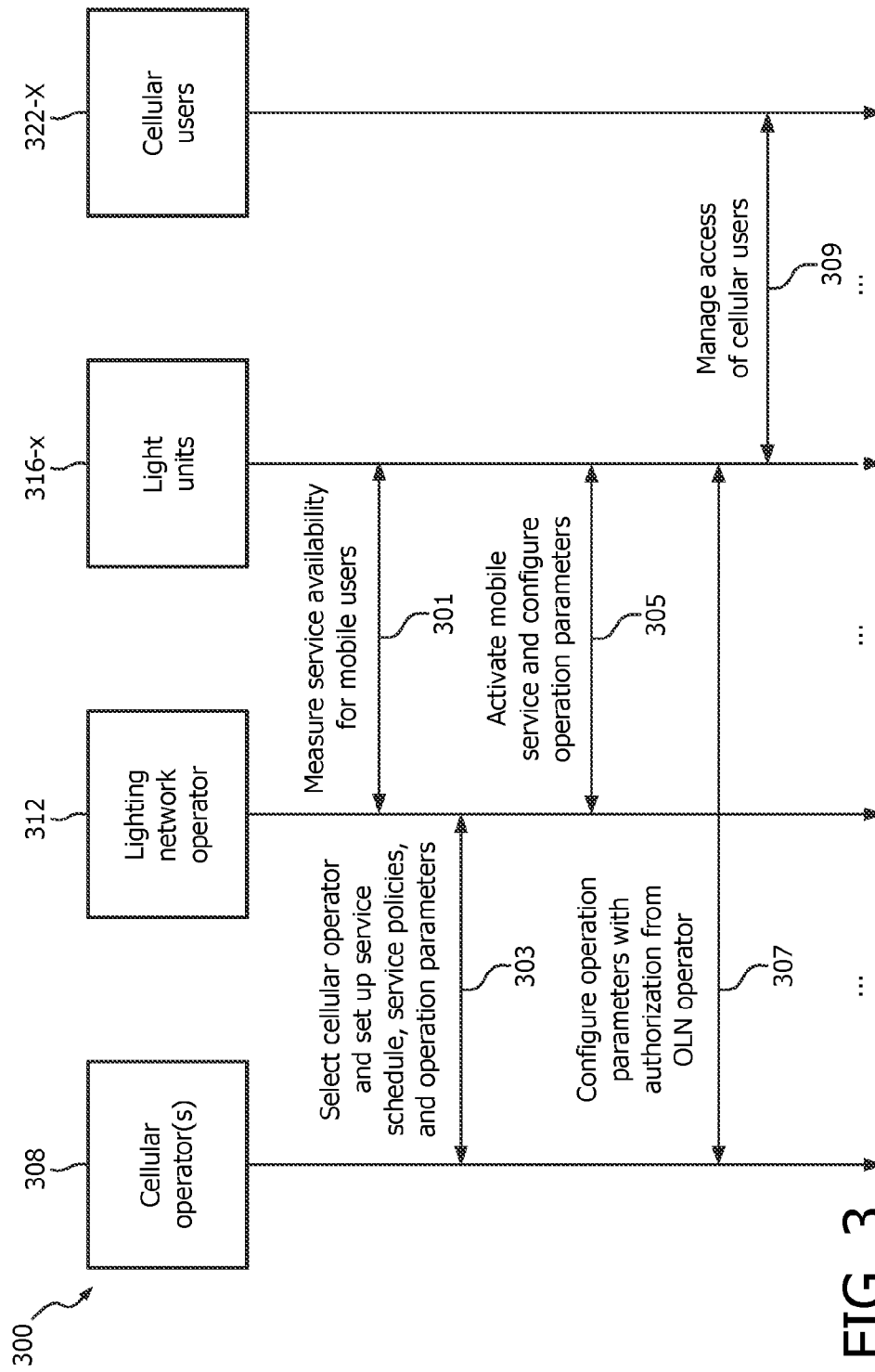
FIG. 3 is a flow diagram that illustrates a process in accordance with embodiments of the present system.

A process performed by embodiments of the present system will now be described with reference to FIG. 3 which is a flow diagram which illustrates a process 300 in accordance with embodiments of the present system. The process 300 may be performed using one or more computers communicating over a network such as the network 124 and may include one of more of the following acts. In operation, the process 300 may start during act 301 where a lighting network operator 312 may map out service availability of its managed light units such as the light units 316-x. This may, for example, be done by monitoring the traffic/capacity of the light units 316-x directly and/or as reported by the light unit(s) and forming or updating corresponding service availability information (SAD. In accordance with embodiments of the present system, the service availability information (SAI) may solely or additionally be determined by monitoring communications to and/or from each of the light units 316-x. The lighting network operator 312 may form or update a database (e.g., a service availability database) to store information related to the determined service availability of each of the light units 316-x. Collectively the service availability of all of the managed light units 316-x may be known as a lighting network mobile service map or service availability map (SAM) and may represent the service availability of each of the light units 316-x. The lighting network operator 312 may then store the SAM in a memory of the system such as in a SAM database. The service availability of a light unit 316-x of the managed light units 316-x may be represented by attributes such as those shown in Table 1 below and may be indexed in the SAM in accordance with an entry of a corresponding light unit 316-x of the managed light units 316-x.

TABLE 1

| | Service Availability Information Description | |
|---|---|---|
| Attribute | General Description | Detailed Description |
| Location (Loc) | Location of light unit with embedded base station | A geophysical location or a location in a lighting matrix of each light unit |
| Height (Hgt) | Height of embedded base station | Absolute height or height relative to ground of each light unit |
| Avail Time (At) | Available time | Time periods associated with a clock (e.g., 7:00 AM-7:00 PM) |
| Range (Rng) | Range, and/or the transmission power of a corresponding light unit of the light units | Range may be reported as a distance (e.g., feet, meters, miles, kilometers, etc.) |
| Mode (Mo) | The device mode and capability of wireless devices built in or attached to a light unit. | The device type may be a femto/micro base station or relay. The device mode may include supporting standards (e.g., 3GPP, CDMA, GSM, WiFi, etc.) and release version. For example, 3GPP release 9 (HSPA+), 3GPP release 10 (LTE), 3GPP release 11 (LTE-advanced). For another example, for WiFi, the mode may include 802.11a/b/g/n. The device capability may include information related to transmission/reception capabilities such as a number of antennas and supporting MIMO mode (for example, in LTE, MIMO technologies include transmit and receive diversity, single user (SU)-MIMO, multiuser (MU)-MIMO, closed-loop rank-1 precoding, and/or dedicated beamforming, Coordinated Multi-Point (CoMP) transmission and reception), the frequency band (5 MHz, 10 MHz, 15 MHz, or 20 MHz), time division duplexing (TDD), frequency division duplexing (FDD), etc. |

TABLE 1-continued

Service Availability Information Description

| Attribute | General Description | Detailed Description |
|---|---|---|
| Traffic (Trf) | Maximum number of CSs or traffic flows that the system may be able to serve | These attributes may be limited by device (e.g., CS) capability, access capacity and/or backhaul capacity. In other cases, the access capacity and the backhaul capacity are independent of a cellular operator. In this case, the light server may determine these attributes independently. However, in some cases, the access capacity and/or the backhaul capacity may depend upon capabilities of a cellular operator. For example, if CSs use a licensed cellular spectrum to access light units, this may depend on the cellular provider and its frequency planning. In this case, the lighting operator and the cellular operator may need to determine together (e.g., see step 2) the access capacity and/or the backhaul capacity. |
| Bandwidth (Bw) | Bandwidth | Bandwidth necessary for serving lighting network users such as CSs and/or applications/services. |
| Current Serving (CSer) | Current serving cellular operators, local coverage, service schedule and service policies | e.g., see act 303 |
| Backhaul (BH) | Backhauling capacity | capacity between the light unit and the core infrastructure |
| Interference (IF) | Measured interference on different frequency bands available | e.g., a noise measurement |

The lighting network operator 312 may further monitor for changes of service availability (e.g., due to changes in network operation, structure, traffic patterns, etc.) within the lighting network, and may update the service availability information and/or the SAM accordingly when changes (e.g., in the lighting network 114) are detected. For example, if a light unit 316-$x$ with an embedded cellular communication module is determined to have been added or upgraded in the lighting network, the lighting network operator 312 may update the SAM accordingly. Another example is when traffic patterns change in the lighting network due to specific operation or service being performed at certain areas, such as maintenance, or remote control of light units 316-$x$ for a certain event, etc. Accordingly, when this change (e.g., in traffic patterns within the lighting network) is detected, the lighting network operator 312 may update the SAM to reflect this change. Accordingly, the lighting network operator 312 may monitor for certain changes within the lighting network, and reanalyze service availability within the lighting network and update the SAM in accordance with the reanalyzed service availability, when these certain changes are detected within the lighting network. After completing act 301 or when it is detected that the service time period (Ts) has lapsed, the process may continue to act 303.

During act 303, the lighting network operator 312 may select one or more cellular operator(s) 308 to serve for a certain service area (e.g., of the lighting network), negotiate service schedule, service policies, and/or set up operational parameters. The lighting network operator 312 may further obtain information related to measured cellular coverage (e.g., excellent, good, or intermittent coverage, dead-zones, etc.) within its coverage area (e.g., the service area of the lighting network) based upon measurements sensed and/or obtained from the managed light units, and may represent this in the SAM by, for example, updating the SAM accordingly. The lighting network operator 312 may further provide the SAM to one or more selected cellular operators 308 using any suitable method (e.g., direct transmission, email, etc.). The cellular operators 308 and/or the lighting network operator 312 may then run analysis (e.g., which may include simulation and/or test routines) to determine how much extra service capacity (ESC) may be provided by the lighting network for use by a cellular network (e.g., of a corresponding cellular operator 308). Further, the cellular operators 308 may use the calculated extra service capacity (ESC) to determine how much it may contribute to a gap in the unmet needs of the cellular operator from area-to-area and time-to-time. In determining the ESC, for example, if the cellular users 322-$x$ such as CSs use a licensed cellular spectrum to access one or more managed light units 316-$x$, this may include the frequency planning and optimization of the lighting network separately from, or together with, one or more cellular networks of corresponding cellular operators 308, as may be desired. The outcome of the above analysis of extra service capacity and the network optimization may include a subset of operational parameters such as those shown in Table 2 below. However, other operational parameters are also envisioned and may be determined by the system and/or user, as desired. As network optimization is beyond the scope of the present application, a detailed description will not be provided for the sake of clarity.

TABLE 2

Extra Service Capacity Subset Operational parameters

| Subset Operational parameter | Definition |
|---|---|
| Frequency bands | The cellular frequencies that are allocated for cellular phone use |
| MIMO/Multiple antenna modes (including receive diversity) | The use of multiple antennas at one or both of the transmitter and receiver to improve communication performance |
| Duplexing scheme | E.g., TDD vs. FDD |
| Transmission power | The amount of power used by a radio transceiver to send a signal. Transmit power is generally measured in milliwatts and may be expressed as a power ratio in decibels (dBm). |

Further, with regard to the operational parameters which may be supported by a light unit, these may vary from light unit to light unit of the managed light units 316-$x$ based upon, for example, operational characteristics of a corresponding light unit, such as type, make, model, software, transmission frequencies, etc., which may vary.

Given an infrastructure setting, the quality of coverage locally and cellular user 322-x distribution across the coverage area of a cellular network controlled by a corresponding cellular operator 308, the cellular service provided by the lighting network may be more valuable for a given cellular operator 308 than for other cellular operators 308 at any given time and/or location. Accordingly, the lighting network operator 312 may select a cellular operator 308 to be a serving cellular operator (SCO) for one or more corresponding service time periods (Ts) based upon various criteria such as the best offering price for a particular service schedule, service policies, service coverage area (e.g., defined by service areas of one or more of the light units 316-x), etc. Further, in embodiments where the lighting network operator 308 itself is a user of a cellular infrastructure (e.g., of cellular services such as may be used to transmit and/or receive command and/or control information, surveillance information, environmental information, cellular information, etc.), the lighting network operator 308 may choose a cellular operator 308 which charges the least for the use of the cellular infrastructure (and thus, mobile service) and provides the best compensation/rebate for the returning service as the SCO for a given Ts. In other words, the lighting network operator 312 may take into account reciprocity of service provided by a given cellular operator 308.

Accordingly, to select a cellular operator 308 as a SCO, the lighting network operator may perform a service bidding process in which a negotiation application may select the SCO based upon various criteria which may be set by the user and/or system such as price, reciprocity, preferred status, bandwidth, etc., for services provided by the lighting network operator and/or the SCO during a corresponding service time period (Ts). Each of these criteria may further be weighted so that more emphasis may be applied to a certain criteria over other criteria. Accordingly, in embodiments of the present system, the negotiation application may obtain a bid for service from one or more of the cellular operators 308 and may rank each cellular operator 308 in accordance with the bid submitted by the cellular operator 308. For example, assuming that each of a plurality of mobile service operators 308 submits a bid for the same mobile service (e.g., service schedule, service policy, and parameters), the negotiation engine may rank the cellular operator 308 which submitted the highest bid (e.g., highest price, lowest reciprocity costs, etc.) highest and the cellular operator 308 which the submitted the lowest bid the lowest. Then, the negotiation engine may select the highest ranked cellular operator 308 as the serving cellular operator.

The service schedule and service policies include information related to one or more of a service area, related light units 316-x (e.g., light units which will provide service), the service time period (Ts), and service capacity (e.g., a maximum number of cellular users 322-x able to access a light unit per time and/or available bandwidth such as an amount of traffic capability of the lighting network operator) granted to the mobile operator 308 that has been selected as the serving cellular operator during the service time period (Ts). The service policies may further include information indicative of whether resources during the service time period (Ts) may be exclusively used by a given cellular operator 308 such as the serving cellular operator or may be shared by several cellular operators 308 and access policies such as first-come-first-use when the resources are not exclusive to a single cellular operator 308 such as the serving cellular operator. The service policies may also include information indicative of traffic engineering and priority handling rules among various users such as: cellular users 322-x, lighting users, and/or emergency users. For example, embodiments of the present system may be configured so that emergency users may receive a highest priority access to the lighting network operator bandwidth.

Additionally, the lighting network operator 312 may also form information related to logical ID/addresses of the light units 316-x and/or security settings (both of which will be referred to as IDSS information for the sake of clarity) for the lighting network and may exchange the IDSS information with the cellular operator 308 selected as the serving cellular operator (SCO). Accordingly, the SCO may then exchange the IDSS information with its cellular users 322-x (e.g., its subscribers such as CSs, applications, etc.) so that these cellular users 322-x may discover and securely access the lighting network of the lighting network operator 312 during the service time period (Ts).

After completing act 303, the process may continue to act 305 where the lighting network operator 312 may activate cellular service and/or may configure operational parameters. Accordingly, the lighting network operator 312 may upload the service schedule and service policies to the light units 316-x as agreed and/or set during act 303. The lighting network operator 312 may further configure operational parameters of each related light unit 316-x of the lighting network in accordance with the operational parameters for the service time period (Ts). This operation may occur in real time (e.g., at the start of the current service time period and/or prior to the start of the service time period. When desired and/or the light units have the capability, the related light units 316-x may automatically configure themselves in accordance with the operational parameters for a given service time period (Ts)).

During act 307, the lighting operator 312 may enable the cellular operator 308 selected as the SCO to directly activate mobile service and configure operational parameters of the light units 316-x as per the service schedule, service policies, and/or operational parameters for the corresponding service time period (Ts). Accordingly, the lighting operator 312 may provide the master address of the light units 316-x (or certain light units 316-x of a subgroup of the light units 316-x if service is to be provided in a sub service area of the lighting network) and master security key to the cellular operator 308 selected to be the SCO so that in accordance with embodiments of the present system, this cellular operator 308 may directly manage the light units 316-x and may change operational parameters directly (e.g., without the intervention of the lighting operator 312). Note the master security key here is used for device management, which in accordance with embodiments of the present system, may be different from that is used by users (e.g., CSs) to communicate with the light units 316-x.

After completing act 307, the process may continue to act 309 where it manages cellular service (e.g., wireless access, etc.) provided to users (e.g., CSs and/or applications which are subscribers to the SCO) in accordance with the service schedule, service policies, and service parameters for the current service time period (Ts). Accordingly, the related light units 316-x may manage access of cellular users 322-x which are subscribers (or otherwise authorized by) the cellular operator 308 in accordance with the service schedule, service policies, and/or service parameters for the current service time period (Ts). In this regard, the process may transmit locations of light units 308 (e.g., to supply service), the service schedules, and/or operational parameters (e.g., operating frequencies, etc.) to cellular users who are subscribers of the SCO via the lighting network and/or the cellular network so that these cellular users may access the lighting network for enhanced service. Accordingly, cellular users 322-*x* may handoff between cellular base stations and base stations of light units as required during a handoff routine without an interruption of service. Thus, cellular users 322-*x* may proactively handoff from cellular networks to lighting networks and vice versa, to obtain a desired cellular service and/or QoS when it is detected that a cellular user (e.g. a CS, etc.) has entered a service area of the lighting network during the current service time period (Ts). Similarly, the cellular users 322-*x* may handoff (e.g., proactively) back to a cellular network once they are no longer in a service area of the lighting network or when the current service time period (Ts) lapses. By doing so, cellular users 322-*x* may continuously maintain a cellular service link whether in a service area of the lighting network or the cellular network.

Figure 4:
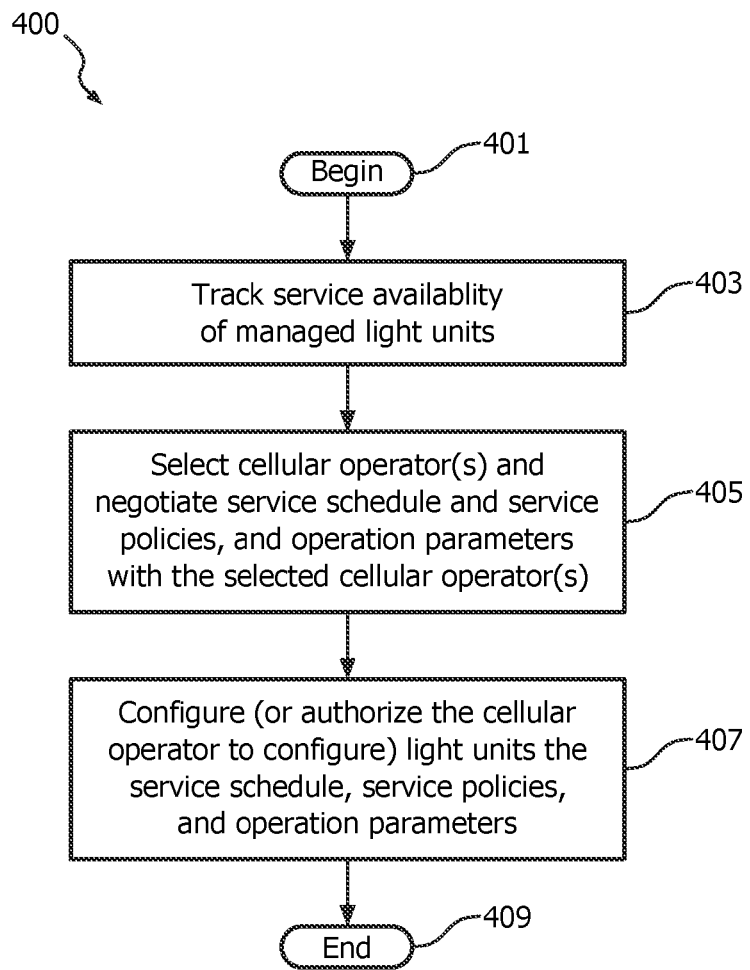
FIG. 4 is a flow diagram that illustrates a process in accordance with embodiments of the present system.

FIG. 4 is a flow diagram that illustrates a process 400 in accordance with embodiments of the present system. The process 400 may be performed using one or more computers communicating over a network such as the network 124. The process 400 may illustrate acts performed by a lighting operator and/or a cellular operator to dynamically provide cellular services for selected users such as CS. The process 400 may include one of more of the following acts. In operation, the process 400 may start during act 401 and continue to act 403.

During act 403, the lighting operator may track service availability of managed LUs under its control and form corresponding SAI information and/or a SAM as set forth during act 301 above. After completing act 403, the process may continue to act 405. During act 405, the process may select one or more cellular operators as an serving cellular operator (SCO) and/or may perform a service bidding process to negotiate service schedules, service policies, and/or operational parameters with the SCOs. Accordingly, the process may employ a negotiation application to automatically perform the service bidding as discussed during act 303, if desired. After completing act 405, the process may continue to act 407.

During act 407, the process may configure the light units in accordance with the service schedule, service policies and/or operational parameters negotiated during act 405. Accordingly, the process may transmit information related to the negotiated schedule, service policies and/or operational parameters to the light units and/or may provide the SCOs with information to control one the light units such as a master address of the lighting network and/or a master security key, so that the SCO may directly manage and/or change operational parameters of the corresponding light units of the lighting network directly (e.g., without having the lighting network operator effect the changes). The light units may then receive this information (e.g., the information related to the negotiated schedule, service policies and/or operational parameters) and configure themselves to function in accordance with the received information (e.g., the service schedule, service policies and/or operational parameters) so as to provide cellular service to cellular users who are subscribes of the SCO. After completing act 407, the process may continue to act 409, where it ends.

Figure 5:
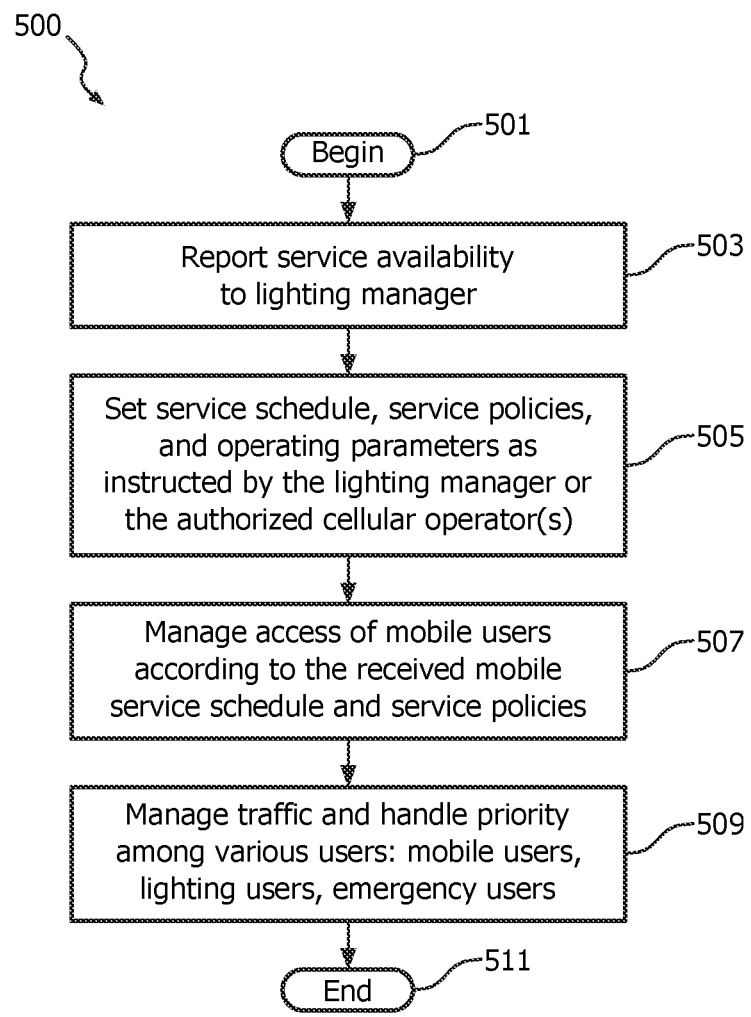
FIG. 5 is a flow diagram that illustrates a process in accordance with embodiments of the present system.

FIG. 5 is a flow diagram that illustrates a process 500 in accordance with embodiments of the present system. The process 500 may be performed using one or more computers communicating over a network such as the network 124. The process 500 may illustrate acts performed to dynamically provide cellular service to cellular users. The process 500 may include one of more of the following acts. In operation, the process 500 may start during act 501 and continue to act 503. During act 503, light units of a lighting network controlled by a lighting operator may report service availability to the lighting operator. Accordingly, the light units of a lighting operator may determine service availability and report corresponding information to the lighting operator which may then form corresponding SAI and/or SAM information. After completing act 503, the process may continue to act 505.

During act 505, the lighting and/or cellular (if permitted) operators may set service schedule, service policies, and/or operational parameters as controlled by the lighting operator and/or a cellular operator. Accordingly, the service schedule, service policies and/or operational parameters may be set in accordance with a service negotiation process (as discussed above with regard to process 300) and/or in accordance with other settings (e.g., user settings, system settings obtained from a lookup table, etc.). After completing act 505, the process may continue to act 507.

During act 507, the process may manage access of cellular stations (e.g., of the authorized cellular operator) in accordance with the service schedule and/or service policies. Accordingly, the lighting operator and/or the cellular operator (if authorized) may transmit information related to the service schedule, service policies, and/or operational parameters to the light units so as to configure the light units to provide cellular service to cellular users. After completing act 507, the process may continue to act 509. During act 509, the process may manage traffic and/or handle priority among various cellular users such as cellular stations, applications, and/or emergency users (such as cellular stations which may not be subscribers to the cellular operator) as well as provide lighting services. After completing act 509, the process may continue to act 511 where it ends.

Figure 6:
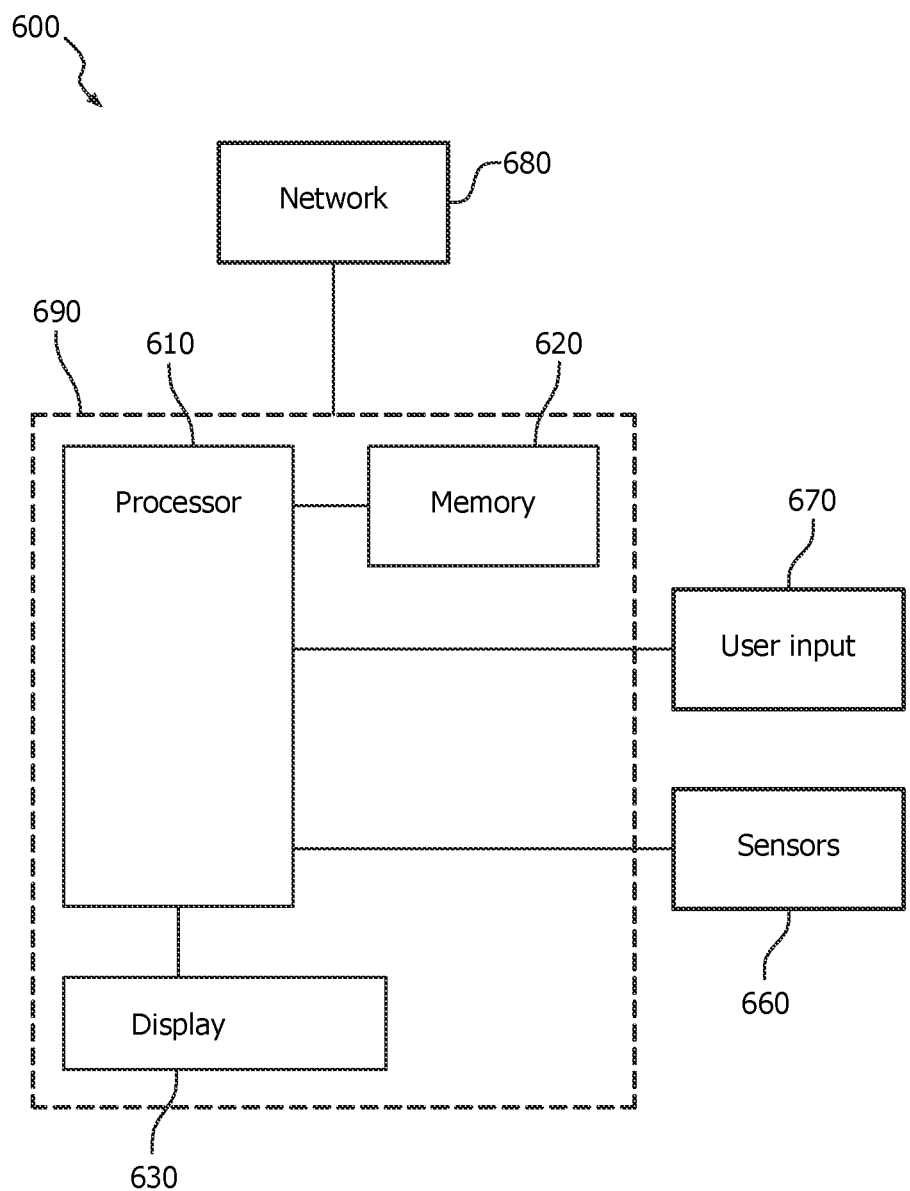
FIG. 6 shows a portion of a system (e.g., control portion, retrieval portion, object recognition portion, image capture portion, etc.) in accordance with embodiments of the present system.

FIG. 6 shows a portion of a system 600 (e.g., light unit, light unit communication module, lighting operator (e.g., network server, etc.), cellular operator (e.g., network server, etc.), etc.) in accordance with embodiments of the present system. For example, a portion of the present system may include a processor 610 operationally coupled to a memory 620, a display 630, one or more sensors 660, and a user input portion 670. The sensors 660 may include a light unit sensor, environmental sensors (e.g., thermometers, barometers, humidistats, air-quality sensors, etc.), which may provide corresponding sensor information to the processor 610. These sensors 660 may provide sensor information which may be analyzed by the system to determine service availability, lighting conditions, environmental conditions, surveillance, temperature, etc. The memory 620 may be any type of non-transitory device for storing application data as well as other data related to the described operation. The application data and other data are received by the processor 610 for configuring (e.g., programming) the processor 610 to perform operation acts in accordance with the present system. The processor 610 so configured becomes a special purpose machine particularly suited for performing in accordance with the present system.

The user input portion 670 may include a keyboard, mouse, trackball or other device, including touch sensitive displays, which may be stand alone or be a part of a system, such as part of a personal computer, personal digital assistant (PDA), mobile phone, smart phone, set top box, television or other device for communicating with the processor 610 via any operable link. The user input portion 670 may be operable for interacting with the processor 610 including enabling interaction within a UI as described herein. Clearly the processor 610, the memory 620, display 630 and/or user input device 670 may all or partly be a portion of a computer system or other device such as a cellular station, light unit and/or other device (e.g., a cellular operator device, lighting operator device, etc.) as described herein.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 620 or other memory coupled to the processor 610.

The program and/or program portions contained in the memory 620 configure the processor 610 to implement the methods, operational acts, and functions disclosed herein. The memories may be distributed, and the processor 610, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 610. With this definition, information accessible through a network is still within the memory, for instance, because the processor 610 may retrieve the information from the network for operation in accordance with the present system.

The processor 610 is operable for providing control signals and/or performing operations in response to input signals from the user input portion 670, the sensor 660, as well as in response to other devices of a network and executing instructions stored in the memory 620. The processor 610 may be an application-specific or general-use integrated circuit(s). Further, the processor 610 may be a dedicated processor for performing in accordance with the present system or may be a general-purpose processor wherein only one of many functions operates for performing in accordance with the present system. The processor 610 may operate utilizing a program portion, multiple program multiple program segments, and/or may be a hardware device utilizing a dedicated or multi-purpose integrated circuit.

Thus, embodiments of the present system may optimize available cellular and lighting infrastructures to provide cellular service to users such as users of cellular stations, lighting, and/or applications. Accordingly, embodiments of the present system may map out mobile service capacity and needs from location-to-location and time-to-time, and provide extra capacity to cellular operators who may desire use of this extra capacity. In other words, the present system may determine when, where, with what capacity is available to serve users and may provide this capacity to cellular operators so that the cellular operators may provide this capacity to their customers (e.g., subscribers, etc.). Further, embodiments of the present system may manage access control and handle event/traffic priority to provide QoS as agreed (e.g., via a service bidding process) to various users and operators such as mobile broadband users, lighting users, affiliate applications (e.g., lighting monitoring, control, surveillance, environment monitoring, etc), and/or emergency users.

By incorporating communication modules into light units of a lighting network as described herein, the communication modules may generally be located closer to cellular stations which they provide service to than the access points (e.g., base stations) that typically service the cellular station. Further, by reducing the distance between the communication modules and cellular stations within a cellular service area, throughput may be increased while power consumption may be reduced. Accordingly, by including the communication modules in light units of a lighting network, the lighting network may be leveraged to enhance the service for users of cellular stations. In addition, the light units may provide additional services to users, such as access, monitoring, control of light units (e.g., in a user's home or work environment, etc.), surveillance, and/or environmental reporting services. Accordingly, lighting networks in accordance with embodiments of the present system may provide environmental monitoring and/or surveillance capabilities to a user such as cellular stations or other devices as well as applications, etc. which may communicate with the lighting network. Further, A lighting network has its own needs for using the communication infrastructure, e.g., for basic lighting and energy monitoring/control. Additional services, such as integrated surveillance, and environment monitoring may also be provided by the lighting network, but of course depending on specific bandwidth requirements.

In some cases, lighting networks rely on the cellular infrastructure of a cellular access network to support lighting and other value added services and may include their own dedicated backhaul infrastructure. In accordance with embodiments of the present system, the backhaul infrastructure may be utilized to provide services to cellular users. Further, while cellular operators will be interested in bringing more traffic to their networks, such as traffic from lighting and other services running on the lighting networks, meeting the overall increasing demand for the cellular infrastructure may always be a challenge. Accordingly, embodiments of the present system provide a system and/or method which provides a lighting network which may be configured to operate with one or more cellular networks to provide services to cellular users. Moreover, embodiments of the present system may be configured to enable lighting networks to serve both their own users as well as users from multiple cellular operators on-demand.

Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

The specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method performed by a lighting management system to control a lighting network having a plurality of light units, the method comprising acts of:
    obtaining, by a lighting operator, information related to service availability for each of the light units;
    mapping the information related to service availability for each of the light units to form a service availability information map comprising attribute information of each of the light units;
    determining one or more of service policies, service schedules, and operational parameters for each of the plurality of light units for a service time period; such that within the service time period, the lighting network is available for providing cellular communication for a plurality of cellular stations; and
    providing cellular communication service to one or more cellular stations in a service area of the light units in accordance with one or more of the determined service policies, service schedules, and operational parameters for the service time period.

2. The method of claim 1, further comprising an act of selecting a serving cellular operator for the service time period from a plurality of cellular operators, wherein each cellular operator corresponds with a different cellular service provider.

3. The method of claim 1, further comprising an act of providing one or more of environmental and surveillance information in accordance with one or more of the determined service policies, service schedules, and operational parameters.

4. The method of claim 1, further comprising an act of controlling luminaires of the plurality of light units to provide illumination in accordance with one or more of the service policies, service schedules, and operational parameters for the service time period.

5. The method of claim 2, wherein the serving cellular operator is selected in accordance with bid information received from one or more of the plurality of cellular operators.

6. The method of claim 5, further comprising an act of activating cellular service for the one or more cellular stations which are subscribers of the serving cellular operator only during the service time period.

7. The method of claim 1, further comprising acts of:
    determining whether the service time period has elapsed; and
    performing handoffs of for the one or more cellular stations from corresponding communication devices of the lighting network to base stations of a cellular network controlled by the serving cellular operator when it is determined that the service time period has elapsed.

8. A lighting system to provide mobile communication services, the lighting system comprising:
    a plurality of light units each having a wireless communication portion and a luminaire comprising at least one light source to provide illumination, the wireless communication portion comprising a base station to provide cellular communication service to one or more cellular stations; and
    a lighting operator which:
        obtains information related to service availability for each of the light units;
        maps the information related to service availability for each of the light units to form a service availability information map comprising attribute information of each of the light units;
        determines one or more of service policies, service schedules, and operational parameters for each of the plurality of light units for a service time period; such that within the service time period, the lighting network is available for providing cellular communication for a plurality of cellular stations;
        and provides cellular communication service to one or more cellular stations in a service area of the light units in accordance with one or more of the determined service policies, service schedules, and operational parameters for the service time period.

9. The lighting system of claim 8, wherein the lighting operator further selects a serving cellular operator for the service time period from a plurality of cellular operators, wherein each cellular operator corresponds with a different cellular service provider which controls a corresponding cellular network.

10. The lighting system of claim 8, wherein the lighting operator further provides one or more of environmental and surveillance information in accordance with one or more of the determined service policies, service schedules, and operational parameters.

11. The lighting system of claim 8, wherein the lighting operator further controls luminaires of the plurality of light units to provide illumination in accordance with one or more of the service policies, service schedules, and operational parameters for the service time period.

12. The lighting system of claim 9, wherein the lighting operator further selects the serving cellular operator in accordance with bid information received from one or more of the plurality of cellular operators.

13. The lighting system of claim 12, wherein the lighting operator further activates cellular service for the one or more cellular stations which are subscribers of the serving cellular operator only during the service time period.

14. The lighting system of claim 8, wherein the lighting operator:
    determines whether the service time period has elapsed; and
    handoffs one or more of the cellular stations from corresponding communication devices of the lighting network to base stations of a cellular network controlled by the serving cellular operator when it is determined that a current service time period has elapsed.

15. A computer program stored on a non-transitory computer readable memory medium, the computer program configured to provide mobile communication services, the computer program comprising:
    a program portion configured to:
        obtain information related to service availability for each of one or more light units;

map the information related to service availability for each of the light units to form a service availability information map comprising attribute information of each of the light units;

determine one or more of service policies, service schedules, and operational parameters for each of the plurality of light units for a service time period; such that within the service time period, the lighting network is available for providing cellular communication for a plurality of cellular stations; and provide cellular communication service to one or more cellular stations in a service area of the light units in accordance with one or more of the determined service policies, service schedules, and operational parameters for the service time period.

* * * * *